United States Patent

Day et al.

[11] Patent Number: 6,016,400
[45] Date of Patent: Jan. 18, 2000

[54] PRELOADING SOFTWARE ONTO A COMPUTER SYSTEM

[75] Inventors: Michael Norman Day, Round Rock, Tex.; Jesse Charles Frye, Raleigh, N.C.; Aylwin Yim Seen, Austin, Tex.; Philip McArthur Simpson, Wemyss Bay, United Kingdom

[73] Assignee: International Business Machines Corporation, Armonk, N.Y.

[21] Appl. No.: 08/770,027

[22] Filed: Dec. 19, 1996

[30] Foreign Application Priority Data

Jan. 11, 1996 [GB] United Kingdom .................... 9600534

[51] Int. Cl.⁷ .................................................. G06F 9/445
[52] U.S. Cl. ................................. 395/712; 713/2
[58] Field of Search .................... 395/712, 651, 395/652, 200.51, 200.52, 200.5; 713/1, 2, 100; 709/220, 221, 222

[56] References Cited

U.S. PATENT DOCUMENTS

| | | | |
|---|---|---|---|
| 5,142,680 | 8/1992 | Ottman et al. | 395/712 |
| 5,210,875 | 5/1993 | Bealkowski et al. | 395/652 |
| 5,367,686 | 11/1994 | Fisher et al. | 395/712 |
| 5,418,918 | 5/1995 | Vander Kamp et al. | 395/652 |
| 5,469,573 | 11/1995 | McGill, III et al. | 395/712 |
| 5,546,585 | 8/1996 | Soga | 395/652 |
| 5,555,416 | 9/1996 | Owens et al. | 395/712 |
| 5,684,996 | 11/1997 | Westerholm et al. | 395/712 |
| 5,692,190 | 11/1997 | Williams | 395/652 |
| 5,694,600 | 12/1997 | Khenson et al. | 395/652 |
| 5,696,975 | 12/1997 | Moore et al. | 395/712 |
| 5,715,456 | 2/1998 | Bennett et al. | 395/652 |
| 5,715,463 | 2/1998 | Merkin | 395/712 |
| 5,717,930 | 2/1998 | Imai et al. | 395/712 |

*Primary Examiner*—Eric W. Stamber
*Attorney, Agent, or Firm*—Anne Vachon Dougherty; Douglas W. Cameron

[57] ABSTRACT

A method is described for preloading operating system software onto a computer system. A manufacturing compact disk is provided which stores the complete range of software which may be stored on the computer system. Associated with the computer system is a manufacturing diskette which includes installation files which define which software on the CD is to be transferred to the system. This manufacturing diskette also includes diagnostic and/or other code which is employed at other stages of the system assembly process. In operation, the CD and diskette are inserted into the system and the software defined by the diskette installation files is transferred from the CD to the system hardfile.

9 Claims, 3 Drawing Sheets

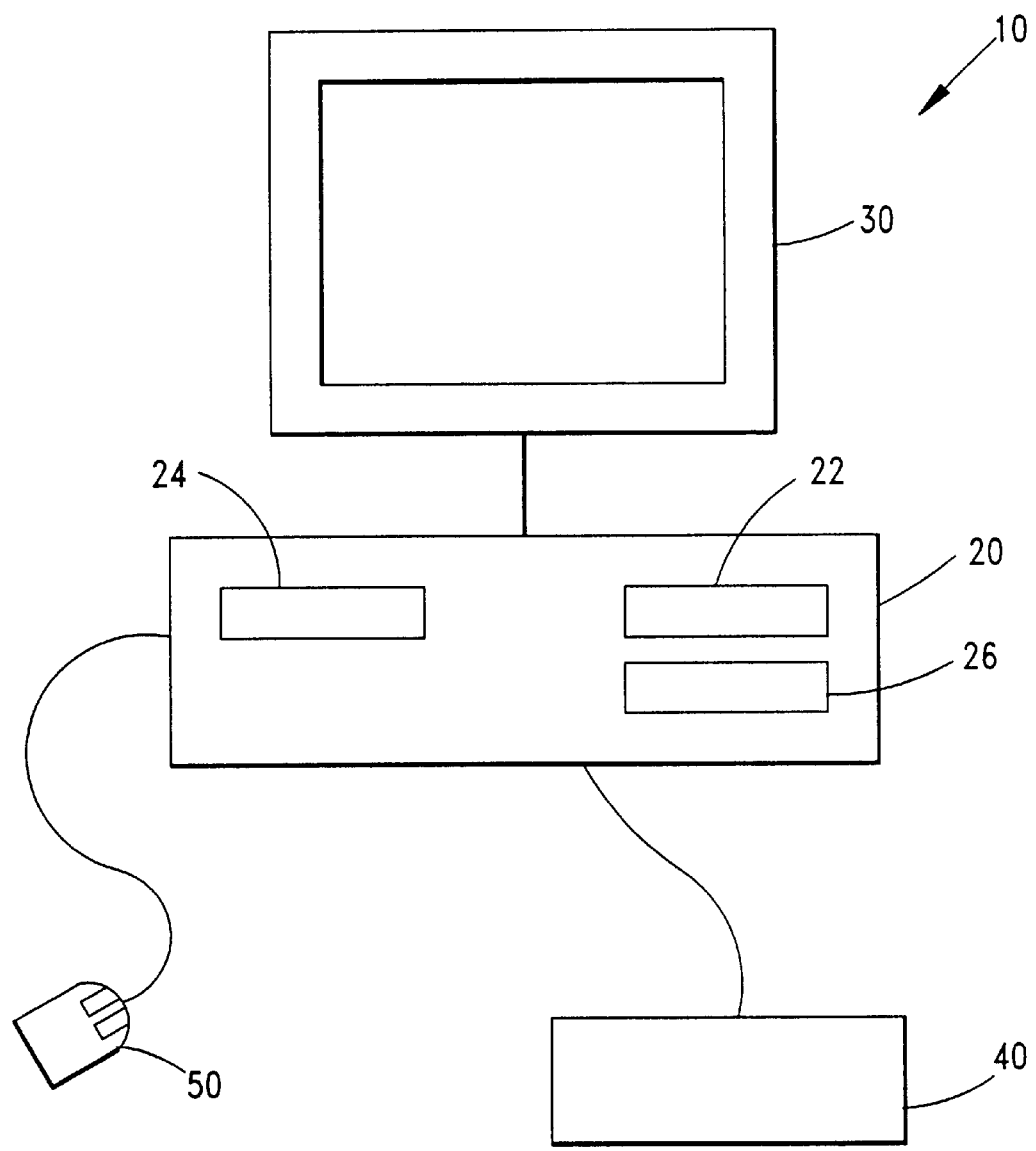

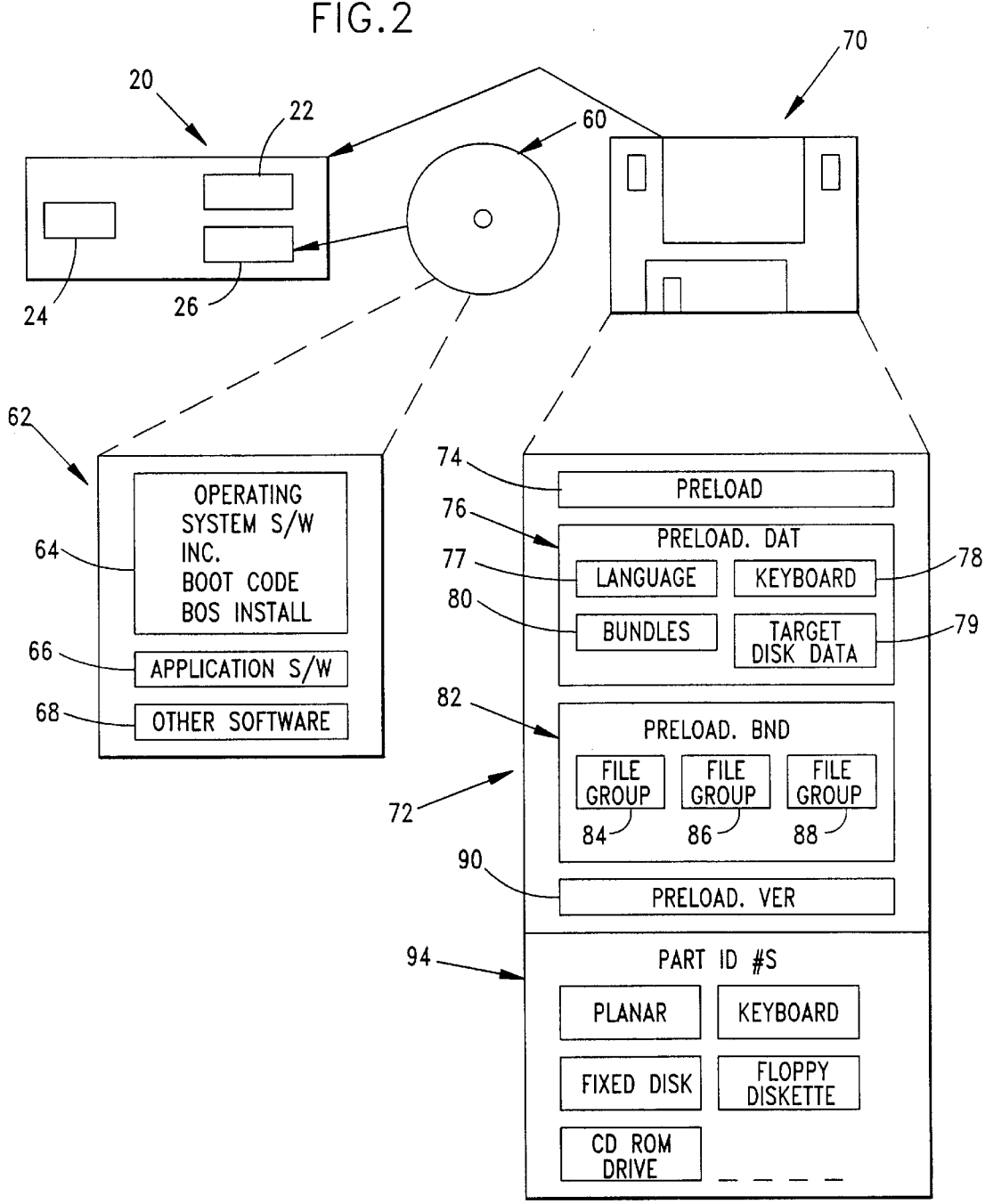

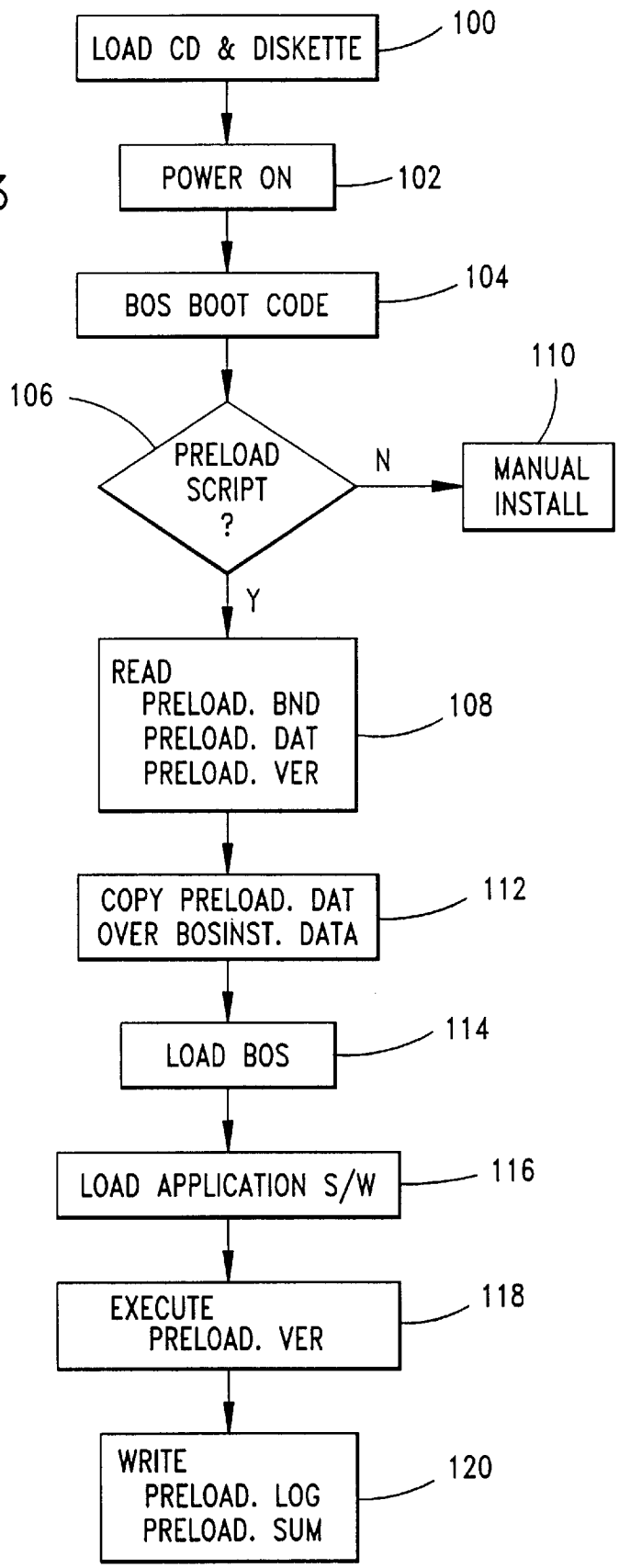

PRELOADING SOFTWARE ONTO A COMPUTER SYSTEM

TECHNICAL FIELD

The present invention relates to the preloading of software onto a computer system.

BACKGROUND OF THE INVENTION

It is common practice in the data processing industry and especially in the personal computer industry to preload operating system and application software onto an individual system as part of the manufacturing process. In the past, the relatively small number of different operating systems available for use with a personal computer meant that a high degree of standardization was possible in the manufacturing process. As personal computer systems have become more powerful and therefore capable of using a larger number of different and more sophisticated operating systems and application software, the manufacturing process has to be able to manage a larger number of possible system software configurations. This complexity becomes even greater in today's manufacturing environment wherein the end-user of the system is able to specify in greater detail the exact system configuration required including what software is to be preloaded onto his system. Therefore, the software preload stage of the manufacturing process has to be able to handle a manufacturing environment where each system is potentially unlike any other system in terms of installed software.

Preloading is conventionally carried out using a server based system wherein the server holds the images or all the different types and flavors (e.g. different language versions) of software available for loading. Each individual computer system is connected to the server via an adapter (token ring emulator) and a diskette is loaded with data used to define the software to be loaded onto that system. The major drawbacks with this mode of operation are in the initial cost of the server hardware and also in the ongoing costs of operating and maintaining the server. Furthermore, the process of creating and maintaining software images requires significant effort in terms of skill and manpower.

A number of different schemes have been proposed for installing software onto computer systems in a network. In one known scheme, automatic installation of Solaris software onto chosen systems in a network and also onto a standalone computer system is achieved according to a so-called Custom JumpStart Installation. In the case of software installation onto the hardfile of a standalone system having a diskette drive and a local CD-ROM drive, a diskette is employed to hold the required installation files. A CD carries the Solaria software, a selection of which is to be installed on the system. In brief, after the system boots, the Solaria installation program uses a profile selected from a number of different profiles on the diskette to automatically install the required Solaris software from the CD onto the system hardfile. This form of installation is designed to be employed at the user site and not at the point of manufacture. Furthermore, this technique does not allow for the installation of other software e.g. application software. In addition, this installation method requires every machine's hardware specification to be identical.

What is needed is a simpler method for preloading selected software which reduces costs and also dovetails easily into other steps of the manufacturing process.

SUMMARY OF THE INVENTION

According to the invention therefore there is provided a method for preloading software onto a computer system as part of the system assembly process, the computer system when assembled including a bootable optical disk drive, a mass storage medium for storing operating system and application software, and a diskette drive; the method comprising: loading an optical storage medium into the optical disk drive, the optical storage medium having stored thereon a plurality of items of computer software; loading a manufacturing diskette into the diskette drive, the diskette having stored thereon installation files for defining which of the items of software held on the optical storage medium are to be installed on the mass storage medium of the computer system, and having further stored thereon additional manufacturing data employed during other steps of the system assembly process; and booting the computer system from the loaded optical storage medium and loading, from the optical storage medium, the software defined by the installation files on the diskette.

The technique of the present invention may be used for automatic installation of only operating system software. However, it is advantageously employed in installing both operating system and application software.

The technique of the present invention has a number of advantages over existing software preload techniques. These advantages include: (i) enables custom installation of application software as well as operating system software; (ii) the preload is better integrated into the manufacturing process by virtue of the fact that the existing manufacturing diskette is employed in the preload process; (iii) avoids the need for expensive installation networks or servers; (iv) takes advantage of the CD ROM and other hardware already present in the system; (v) avoids need to prepare multiple software images; and (vi) the preload is fully automated without the need for operator intervention.

A preferred embodiment of the present invention will now be described, by way of example only, with reference to the accompanying drawings.

BRIEF DESCRIPTION OF THE DRAWINGS

FIG. 1 is a block diagram of a personal computer system on which the software is to be installed;

FIG. 2 shows, in representational form, the elements required for the software preload process according to a preferred embodiment of the present invention;

FIG. 3 is a flow diagram showing the preload process according to the preferred embodiment of the present invention.

DESCRIPTION OF THE PREFERRED EMBODIMENT

Referring first to FIG. 1, there is shown a block-diagrammatical representation of a data processing system in the form of a personal computer system 10 having a system unit 20, monitor 30, keyboard 40 and optionally other peripheral devices such as a mouse 50 and printer (not shown). In the preferred embodiment, the computer system is built around a PowerPC 601, 603 or 604 microprocessor which resides on a motherboard (not shown) in the system unit (PowerPC is a trade mark of IBM Corporation). Also included in the system unit are a diskette drive 22, a hard rile 24 and a CD ROM drive 26. All these disk-based devices are mounted and connected into the system unit casing during the system assembly process prior to software preload. It should be noted that the PowerPC system design allows for the CD ROM drive 26 to be a bootable device in the sense that the computer system may boot from a CD ROM in the drive, and the present invention relies on this capability for operation of the software installation process.

The following example will be described with reference to the preload/installation of the IBM AIX operating system (AIX is a trade mark of IBM Corporation). However it should be appreciated that the invention is in no way limited in applicability to this particular software but rather may in principle be employed to preload a large variety of operating systems and application software. Note also that the present technique is applicable to computer systems other than personal computers. Assembly of workstations, and other mid-range computers such as the IBM RS/6000, IBM AS/400 and other non-IBM systems could benefit from this technique (RS/6000 and AS/400 are trade marks of IBM Corporation).

Associated with each system unit during the assembly process is a manufacturing diskette 70 (see FIG. 2) which has stored on it a number of files 94 which (a) define aspects of the system configuration i.e. part numbers for subsystems of the system under assembly (e.g. part numbers for system hardfile, diskette drive, planar, CD ROM drive, mouse, keyboard etc. . . . ) in order to provide assistance to the system assembler during manufacture; and (b) diagnostic files used to test the system unit at various stages of the manufacturing process. As is described in detail below, this manufacturing diskette also has stored thereon data riles for providing automatic software installation.

FIG. 2 shows in representational form the elements required for the preload process. As in FIG. 1, the target computer system unit 20 includes diskette drive 22, hardfile 24 and bootable CD ROM drive 26.

A manufacturing CD ROM 60 is provided which includes the complete set of software 62, including operating system software 64, application software 66 or other software 68 (diagnostic tools for example) which may be installed on each computer system. This single manufacturing CD ROM (and copies thereof) is employed for preloading each computer system irrespective of the required software configuration for the particular system.

The manufacturing diskette 70 includes the special preload files 72 which define which items of software on the manufacturing CD ROM are to be installed on the computer system with which that particular diskette is associated. Taking the example of the preloading or the IBM AIX operating system and other application software, the following files arc present on a DOS formatted manufacturing diskette.

1. Preload 74

This file is the preload customization script and is the first file to be read by the AIX base operating system (bos) install code. The functions of this file are as follows:

a) read all the other necessary files—preload.bnd, preload.ver and preload.dat;

b) use preload.dat file and create the bosinst.data file needed by AIX install;

c) perform other tasks to prepare data required by the rest of the install program.

2. Preload.dat 76

This file is the preload auto install customization list i.e. it specifies a variety of data including the language parameter data 77 of the software to be installed, the keyboard data 78, the target hardfile data 79, and the file groups to be installed 80 (usually with reference to a further file—preload.bnd).

3. Preload.bnd 82

This file contains the preload customization data i.e. it specifies, as bundled file groups 84, 86, 88, the contents of the software to be selected from the manufacturing CD. In the present embodiment, these file groups may be (i) AlX-windows; (ii) DOS Utilities; (iii) Multimedia services etc.

4. Preload.ver 90

This file is the preload verification script i.e. it contains the code to be executed after the installation process is complete. It is used to perform specific customization for the system install and it verifies the installation is complete and the software is operating correctly.

The preload process will now be described with reference to the flow diagram of FIG. 3. First, as indicated at step 100, the manufacturing diskette and CD are inserted into the diskette drive and CD ROM drive respectively of the target computer system. The power to the computer system is then turned on (step 102). The system looks first for base operating (bos) boot code. On finding this code on the CD, the system is booted up by the operating system boot code on the CD (step 104). After the boot process, control is passed to the AIX base operating system (bos) install code. The bos install code reads the preload script (step 106) which if read correctly then executes on the system and attempts to read in the preload.dat, prelaod.bnd and preload.ver files from the manufacturing diskette (step 108). If the preload script is not successfully read (e.g. not present on the diskette) then manual installation is invoked (step 110). At step 112, the preload.dat file is copied over the default bosinst.data rile on the system hardfile and the base operating system is then loaded from the CD to the hardfile (step 114). If preload.bnd has been correctly read from the diskette, the bundled file groups, i.e. software applications, specified in preload.bnd are loaded from the CD onto the system hardfile (step 116). On installation of the application software, various structures in the operating system are changed to define the appropriate paths to the loaded application software.

If the preload.bnd file is not present, the type of installation specified in the preload.dat file drives the auto installation of the software applications and filesets from CD to hardfile. Once installation of the specified application software is complete, the preload.ver (preload verification script) file is executed in order to verify correct preloading of all files (step 118). The results of the verification test are then written to the manufacturing diskette as files preload.sum and preload.log (step 120).

Having thus described our invention, what I claim and desire to secure by Letters Patent is as follows:

1. A method for preloading software onto a computer system as part of the system assembly process, the computer system when assembled including a bootable optical disk drive, a mass storage medium for storing operating system and application software, and a diskette drive, the method comprising:

loading a removable optical storage medium into the optical disk drive, the optical storage medium having stored thereon a plurality of items of computer software;

loading a removable manufacturing diskette into the diskette drive, the manufacturing diskette having stored thereon customized installation files defining which of the items of computer software stored on the optical storage medium are to be installed on the mass storage medium of the computer system, the manufacturing diskette further including additional data employed during other steps of the manufacture of the computer system; and booting the computer system from the loaded optical storage medium and loading, from the optical storage medium, the items of software defined by the installation files on the manufacturing diskette.

2. A method as claimed in claim 1, wherein both operating system software and application software are installed on the mass storage medium from the optical storage medium.

3. A method for preloading software onto a computer system as part of the system assembly process, the computer system when assembled including a bootable first storage drive, a mass storage medium for storing operating system and application software, and a second storage drive, the method comprising:

loading a removable first storage medium into the first drive, the first storage medium having stored thereon a plurality of items of computer software;

loading a removable second storage device into the second drive, the second storage device comprising a manufacturing device having stored thereon customized installation files defining which of the items of computer software stored on the first storage medium are to be installed on the mass storage medium of the computer system, the second storage device further including additional data employed during other steps of the manufacture of the computer system;

booting the computer system from the loaded first storage medium; and loading, from the first storage medium, the items of software defined by the installation files on the manufacturing device.

4. The method of claim 3 wherein said booting comprises:

reading said first storage medium; and invoking the base operating system install code from said second storage device.

5. The method of claim 4 wherein said loading items comprises the steps of:

said base operating system reading at least one preload file from said second storage device; and executing said at least one preload file.

6. The method of claim 5 wherein said executing comprises:

reading items of computer software files from said first storage medium; and storing said items of computer software on said mass storage medium.

7. The method of claim 6 further comprising the step of conducting preload verification testing.

8. The method of claim 7 further comprising the step of writing preload verification testing results to said second storage device.

9. The method of claim 5 wherein said at least one preload file comprises a preload customization script file, a preload auto install customization list and a preload customization data file.

* * * * *